No. 837,265. PATENTED NOV. 27, 1906.
E. FOURCAULT.
APPARATUS FOR THE MANUFACTURE OF CONTINUOUS SHEETS OF GLASS.
APPLICATION FILED OCT. 30, 1905.
4 SHEETS—SHEET 1.
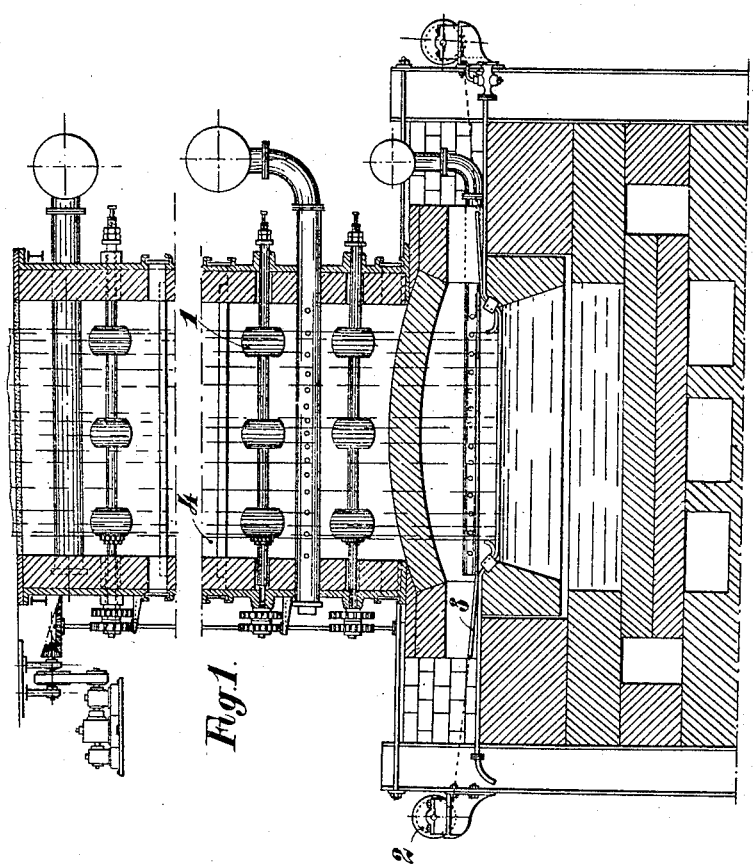

No. 837,265. PATENTED NOV. 27, 1906.
E. FOURCAULT.
APPARATUS FOR THE MANUFACTURE OF CONTINUOUS SHEETS OF GLASS.
APPLICATION FILED OCT. 30, 1905.
4 SHEETS—SHEET 2.
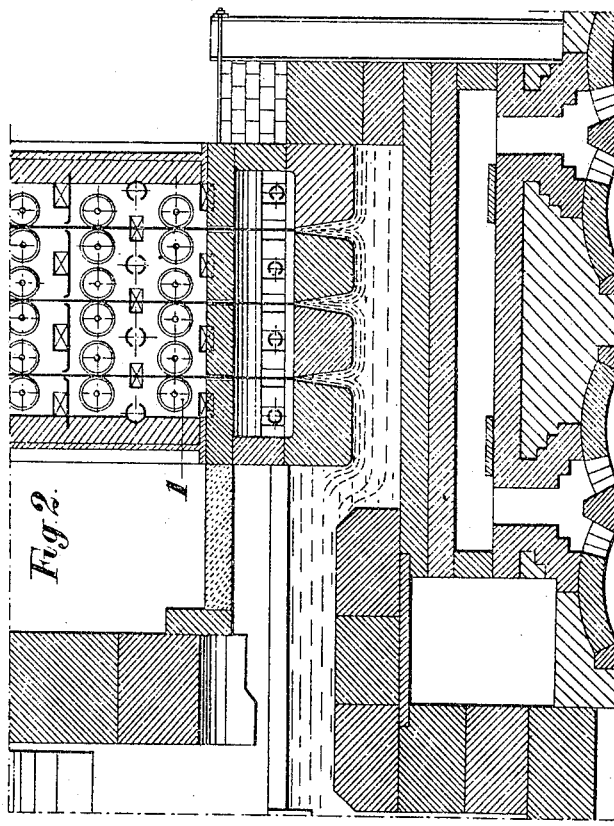

No. 837,265. PATENTED NOV. 27, 1906.
E. FOURCAULT.
APPARATUS FOR THE MANUFACTURE OF CONTINUOUS SHEETS OF GLASS.
APPLICATION FILED OCT. 30, 1905.
4 SHEETS—SHEET 3
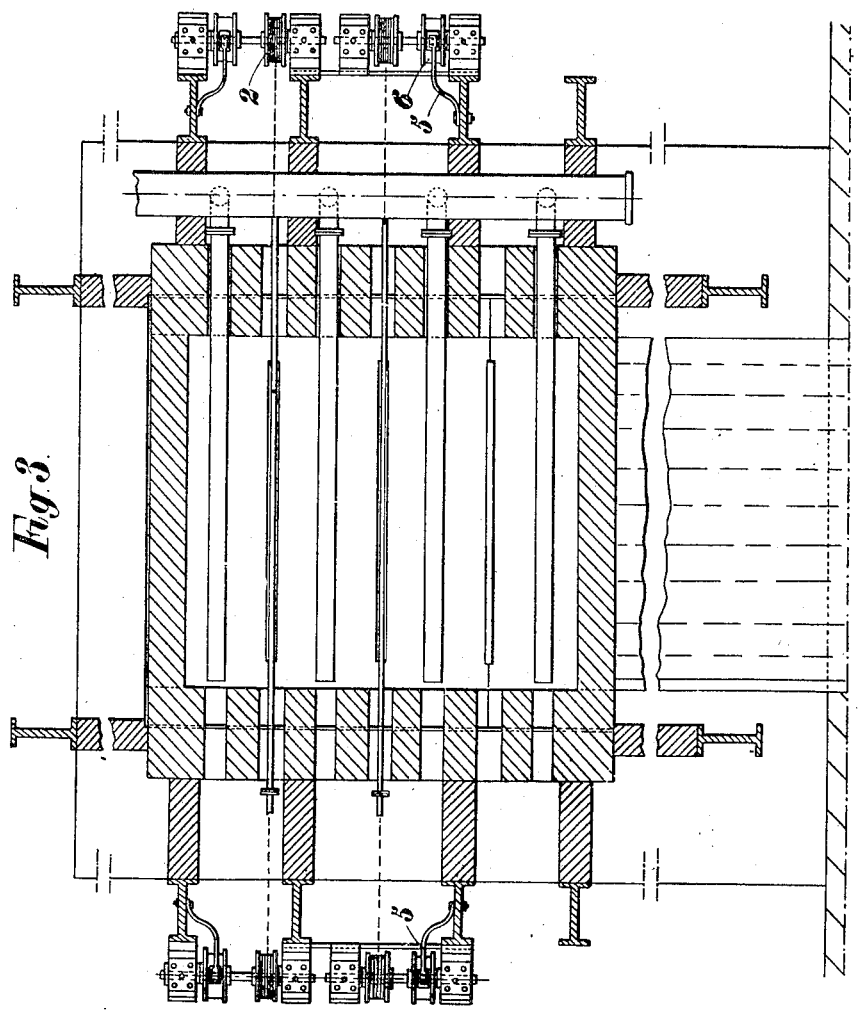

No. 837,265. PATENTED NOV. 27, 1906.
E. FOURCAULT.
APPARATUS FOR THE MANUFACTURE OF CONTINUOUS SHEETS OF GLASS.
APPLICATION FILED OCT. 30, 1905.
4 SHEETS—SHEET 4.
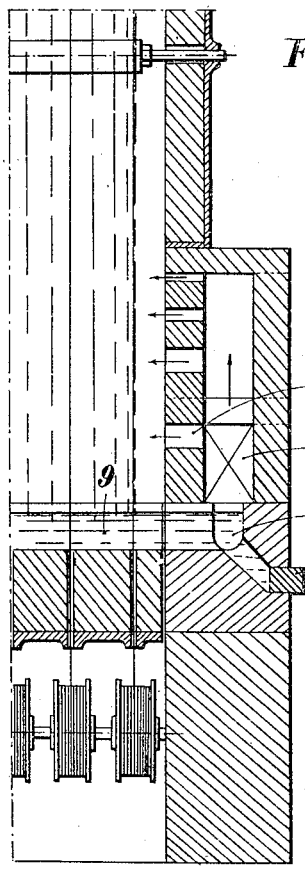
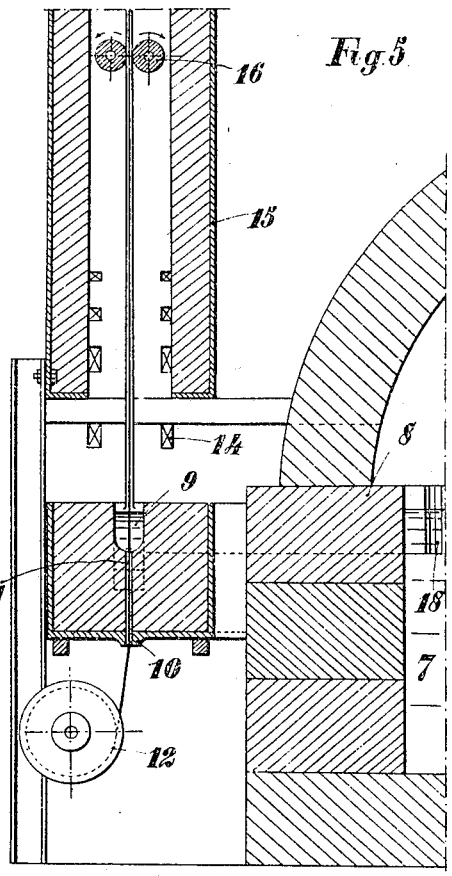
Witnesses
Inventor
Émile Fourcault
By James L. Norris
Atty.

UNITED STATES PATENT OFFICE.

EMILE FOURCAULT, OF LODELINSART, BELGIUM.

APPARATUS FOR THE MANUFACTURE OF CONTINUOUS SHEETS OF GLASS.

No. 837,265.          Specification of Letters Patent.          Patented Nov. 27, 1906.

Original application filed April 5, 1904, Serial No. 201,763. Divided and this application filed October 30, 1905. Serial No. 285,188.

*To all whom it may concern:*

Be it known that I, EMILE FOURCAULT, glass manufacturer, a subject of the King of Belgium, residing at Lodelinsart, Belgium, have invented certain new and useful Improvements in Apparatus for the Manufacture of Continuous Sheets of Glass, of which the following is a specification.

The apparatus for drawing vertically continuous sheets of glass have the disadvantage that the sheets present longitudinal streaks, the quality of the glass being thus lessened. These streaks are caused by the contraction of the glass immediately it leaves the slot in the block or float in the upper part of the reservoir of molten glass at the beginning of the drawing of the glass while the glass is still plastic. This contraction can be prevented by introducing iron wires in the edges of the sheet of glass for obliging this sheet to ascend vertically without being contracted.

This application embodies subject-matter divided out of my original application, Serial No. 201,763, filed April 5, 1904.

Figures 1, 2, 3 show, respectively, in transverse section, cross-section, and horizontal section an apparatus for drawing continuous sheet of glass. Figs. 4 and 5 show in longitudinal and transverse section a modification.

In this apparatus the sheets of glass ascend between asbestos rolls 1 and are gradually cooled till they come cold out of the apparatus, where they are cut by a diamond to the desired length. The metallic wires 4, which must be introduced into the edges of these sheets, are wound on bobbins 2. The wires pass then through small tubes 3, the ends of which dip a little into the molten glass, and are then raised in the edges of the sheet of glass which is drawn. These wires are embedded in the glass when it cools, and thus the glass ascends, drawing along these wires. Brake-blocks 5 bear against pulleys 6 on the axis of the bobbins 2, so as to stretch the wires. The purpose of these wires is to keep the edges of the sheets or plates of glass in position and constrain them to rise by following the wires well stretched without contracting at the base. They have also the advantage of keeping the fragments of glass together in case the sheet or plate should break and also of avoiding stoppages arising therefrom.

Figs. 4 and 5 show an apparatus similar to the preceding one, but arranged so as to embed a great number of metal wires in the drawn sheets or plates of glass. This apparatus is connected to the hearth 7 of the glass-melting furnace by two small channels 8, feeding the molten glass into a cavity 9 in a block of refractory material surrounded by a metal casing 10. The said block of refractory material and its metal casing 10 are provided with a number of small vertical holes 11, through which pass iron or other wires coming from bobbins 12. The glass is kept liquid in the channels 8 by other channels 13, situated above the first-named channels and communicating with the inside of the hearth, the heat that has passed through the heating-channels 13 issuing through small openings 14 on each side of the sheet or plate of glass in process of formation, so as to avoid the too-sudden cooling thereof and to heat the base of the annealing-casing 15. The asbestos rolls 16, which draw up the sheet or plate with a slow continuous motion, need not be as low as the base of the annealing-casing 15, as the metal wire within the sheet or plate of glass supports it. The glass can be run out of the apparatus through plugged passages 17 when desired. To prime the apparatus, all the wires are passed through the holes 11 in the block of refractory material before the molten glass is allowed to run into the aforesaid cavity 9, and they are attached to the plate used for drawing up the glass, so that they are drawn by this plate when the rolls are rotated. The wires being thus attached to the said plate and the lower part of the latter dipping into the cavity 9, the channels 8, leading from the glass-melting hearth, are opened by shifting the floats or blocks 18, and the molten glass then passes through the channels 8 into the said cavity 9, and when this cavity fills up the said plate is raised by rotating the asbestos rolls. The glass adheres to the base of the said plate, and a continuous sheet or plate of glass is drawn slowly up into the annealing-casing and leaves it cold, so that it can be cut to suitable lengths. The molten glass in the aforesaid cavity 9 cannot escape through the holes 11, through which the wires pass, because not only are those holes too small to allow the glass to run through them, but even if it could the wires which rise continuously through the holes obstruct the latter sufficiently to prevent molten glass from passing through the holes, and said holes admit sufficient air to set up a cooling action on the molten glass that might tend to pass therethrough. When it is wished to stop the apparatus, the openings supplying the glass are stopped by the aforesaid floats or blocks 18 and the top holes 17 are opened, the drawing of the sheet or plate of glass being continued until all the glass is out of the cavity 9, this being done to prevent the holes 11 getting choked, which would hinder the carrying out of a subsequent operation. Sheets or plates of glass strengthened by embedded wires will thus be cheaply manufactured, the wires being at distances apart according to the purpose for which the glass is required.
Having thus described and ascertained the nature of my invention and in what manner the same may be performed, I declare that what I claim is—

1. In an apparatus for upwardly drawing an endless sheet of glass, a casing having means for drawing a sheet of glass, means for feeding a wire into the casing thereinto and embedding said wire in the edges of the sheet of glass to prevent contraction of the said sheet.

2. In an apparatus of the class set forth, a casing having means for drawing a sheet of glass, and means for feeding a plurality of wires thereinto and embedding them in the sheet of glass.

In testimony whereof I have hereunto set my hand in presence of two subscribing witnesses.

EMILE FOURCAULT.

Witnesses:
AUGUSTE HUY,
LUCIEN QUINEL.